United States Patent
Mateos et al.

(10) Patent No.: US 10,526,543 B2
(45) Date of Patent: Jan. 7, 2020

(54) METHOD AND PLANT FOR ROASTING BIOMASS

(71) Applicant: LMK ENERGY, Mazingarbe (FR)

(72) Inventors: David Mateos, Pessac (FR); Florian Castagno, Bordeaux (FR)

(73) Assignee: LMK ENERGY, Mazingarbe (FR)

( * ) Notice: Subject to any disclaimer, the term of this patent is extended or adjusted under 35 U.S.C. 154(b) by 275 days.

(21) Appl. No.: 15/114,561

(22) PCT Filed: Jan. 27, 2015

(86) PCT No.: PCT/EP2015/051597
§ 371 (c)(1),
(2) Date: Dec. 27, 2016

(87) PCT Pub. No.: WO2015/110653
PCT Pub. Date: Jul. 30, 2015

(65) Prior Publication Data
US 2017/0130132 A1 May 11, 2017

(30) Foreign Application Priority Data
Jan. 27, 2014 (FR) ...................... 14 50656

(51) Int. Cl.
*C10B 49/06* (2006.01)
*C10B 3/02* (2006.01)
(Continued)

(52) U.S. Cl.
CPC ................ *C10B 49/06* (2013.01); *C10B 3/02* (2013.01); *C10B 53/02* (2013.01); *C10L 5/44* (2013.01);
(Continued)

(58) Field of Classification Search
CPC ........... C10B 49/06; C10B 53/02; C10B 3/02; C10L 5/44; C10L 9/083; Y02E 50/10; Y02E 50/15; Y02E 50/30
See application file for complete search history.

(56) References Cited

U.S. PATENT DOCUMENTS 6,035,791 A * 3/2000 Hery .................. B27K 1/00
110/204
2008/0210536 A1* 9/2008 Hery ...................... C10B 49/04
201/1
(Continued)

FOREIGN PATENT DOCUMENTS

WO 2007000548 1/2007

OTHER PUBLICATIONS

Helsen, L. (2009) Waste Management, 29, 1649-1657.*
International Search Report PCT/EP2015/051597 dated May 8, 2015.

*Primary Examiner* — Brian A McCaig
(74) *Attorney, Agent, or Firm* — Young & Thompson

(57) ABSTRACT

This method for roasting biomass, including the flow by gravity of the biomass from the top towards the bottom of a column (4) with a counter-current of hot gases flowing from the bottom towards the top of the column (4), with the establishment of an increasing temperature gradient from the top towards the bottom of the column (4), the recovery of the gases at the top of the column and their recycling at the bottom of the column (4) by way of a gas circuit (12) so that the gases flow in a closed loop in the column (4) and the gas circuit (12), and the heating of the gases recovered by passing them through a heat exchanger (16) before their recycling at the bottom of the column (4).

22 Claims, 1 Drawing Sheet

Figure 1:
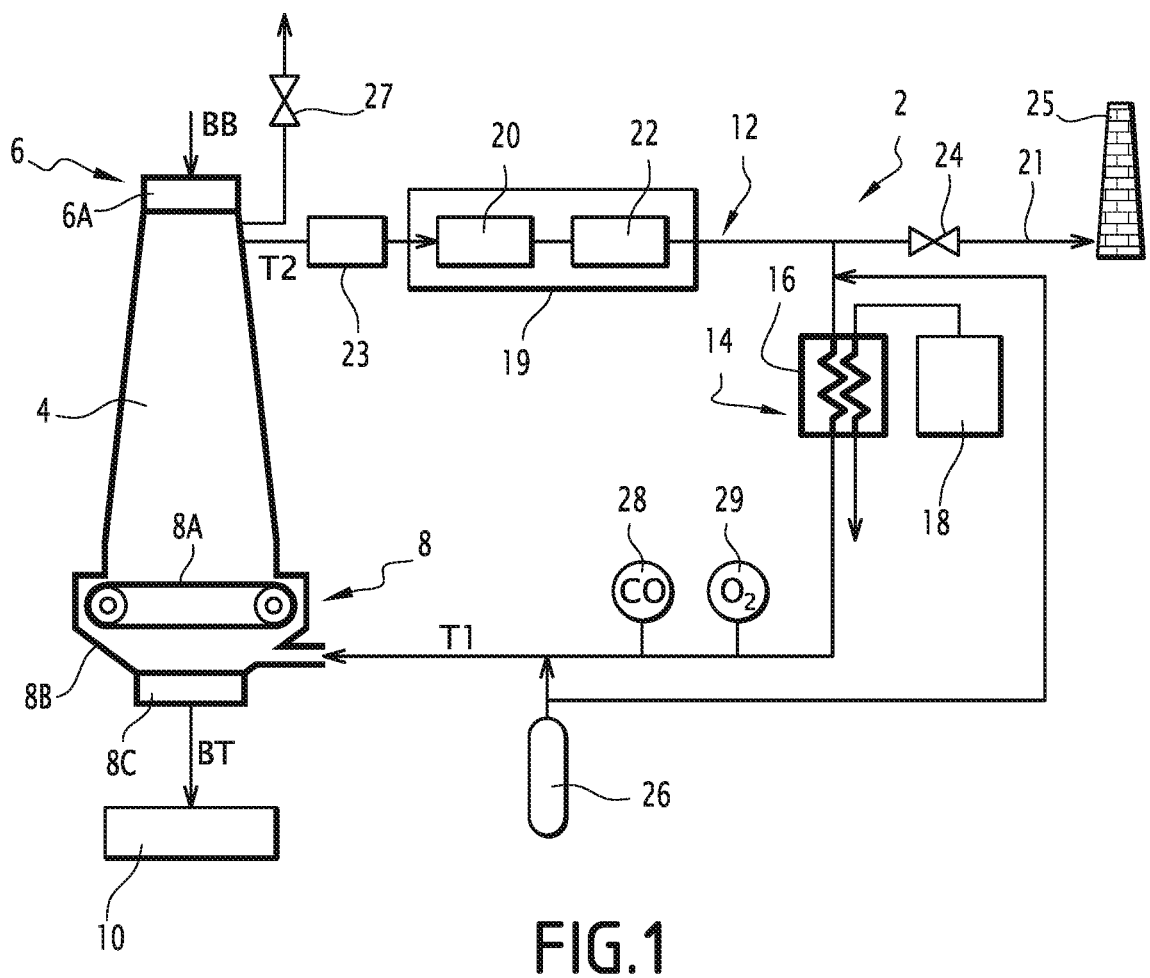

(51) Int. Cl.
*C10B 53/02* (2006.01)
*C10L 5/44* (2006.01)
*C10L 9/08* (2006.01)

(52) U.S. Cl.
CPC ............ *C10L 9/083* (2013.01); *C10L 2290/06* (2013.01); *C10L 2290/60* (2013.01)

(56) References Cited

U.S. PATENT DOCUMENTS

| | | |
|---|---|---|
| 2010/0083530 A1 | 4/2010 | Weisselberg et al. |
| 2010/0242351 A1 | 9/2010 | Causer |
| 2012/0266485 A1* | 10/2012 | Abraham ............... C10B 49/02 34/386 |

* cited by examiner

METHOD AND PLANT FOR ROASTING BIOMASS

TECHNICAL FIELD

The present invention relates to the field of roasting biomass, in particular lingo-cellulose biomass, notably wood and bagasse.

TECHNOLOGICAL BACKGROUND

Ligno-cellulose biomass comprises water, volatile compounds and fixed carbon. The roasting of the biomass allows evaporation of the water and of a portion of the volatile compounds, in order to preserve the most energy-containing compounds.

The roasting of biomass is for example used for producing a fuel having a higher energy/weight ratio and millability than those of the initial biomass and which has better hydrophobic characteristics.

Roasting consists of heating the biomass to a high temperature, generally comprised between 200° C. and 350° C., in a low-oxygen atmosphere, in order to avoid any combustion.

Roasting is for example applied by exposing the biomass to a flow of hot gases produced by a burner integrated into the gas loop supplying the roasting column and burning the roasting gases by means of the addition of an additional fuel in the presence of air used as an oxidizer. WO2007/000548 and WO2011/086262 disclose such methods for roasting biomass.

This type of configuration has the necessity of controlling the dioxygen level in the combustion gases at the outlet of the burner and therefore at the inlet of the roasting column. The prior art mentions a maximum threshold of 2% of oxygen in the flow of hot gases, or, in practice, this value is extremely difficult to maintain permanently during continuous utilization. This threshold was set so as to prevent any undesirable combustion of the biomass during roasting.

SUMMARY OF THE INVENTION

One of the objects of the present invention is to propose a facility for roasting biomass and a method for roasting biomass easy to apply and which has satisfactory yield.

For this purpose, the invention proposes a method for roasting biomass, comprising flow by gravity of biomass from the top to the bottom of a column with a counter-current of hot gases flowing from the bottom to the top of the column, with establishment of an increasing temperature gradient from top to bottom of the column, the recovery of the gases at the top of the column and their recycling at the bottom of the column by means of a gas circuit so that the gases flow in a closed loop in the column and the gas circuit, and the heating of the recovered gases by having them pass through a heat exchanger before their recycling at the bottom of the column.

According to particular embodiments, the method comprises one or several of the following features, taken individually or according to all the technically possible combinations:

a preparation phase comprising the filling of the column and of the gas circuit with an inert gas;

at the end of the preparation phase, the pressure in the column and in the gas circuit is less than 0.5 bars;

the treatment of the recovered gases at the top of the column by having them pass into a condenser before their recycling at the bottom of the column;

the treatment of the recovered gases at the top of the column by having them pass into at least one filtering device for filtering the solid particles contained in the gases, before their recycling at the bottom of the column;

maintaining a pressure of less than 0.5 bars inside the column, for example by adjusting a flow rate of gas discharged from the column and/or from the gas circuit by means of a valve;

the excess gas discharge out of the column and/or of the gas circuit for limiting and adjusting the pressure in the column;

adding inert gas to the gases flowing in the column and in the gas circuit when the carbon monoxide content of the gases flowing in the column and in the gas circuit exceeds a determined threshold;

in a stabilized production phase, the gases are introduced at the bottom of the column at a temperature comprised between 200° C. and 350° C., preferably comprised between 240° C. and 280° C.

The invention also relates to a plant for roasting biomass, comprising a column for movement by gravity of the biomass from the top to the bottom of the column with a counter-current of hot gases flowing from the bottom to the top of the column, and a gas circuit configured for recovering the gases at the top of the column and re-injecting the gases at the bottom of the column so that the gases flow in a closed loop in the column and the gas circuit, in which the gas circuit comprises a heat exchanger for heating the recovered gases at the top of the column before injecting them at the bottom of the column.

According to other embodiments, the plant comprises one or several of the following features, taken individually or according to all the technically possible combinations:

an inert gas source for injecting inert gas into the column and the gas circuit;

a carbon monoxide sensor for determining the carbon monoxide content of the gases flowing in a closed loop;

a dioxygen sensor for determining the dioxygen content of the gases flowing in a closed loop;

the gas circuit comprises a condenser for condensing organic compounds contained in the recovered gases at the top of the column, preferably before their passing into the heat exchanger;

a separator of solid particles for separating solid particles of the gases recovered at the top of the column, preferably before their passing into the heat exchanger;

at least one adjustment valve for discharging the gas from the column or from the gas circuit.

SHORT DESCRIPTION OF THE DRAWINGS

Figure 2:
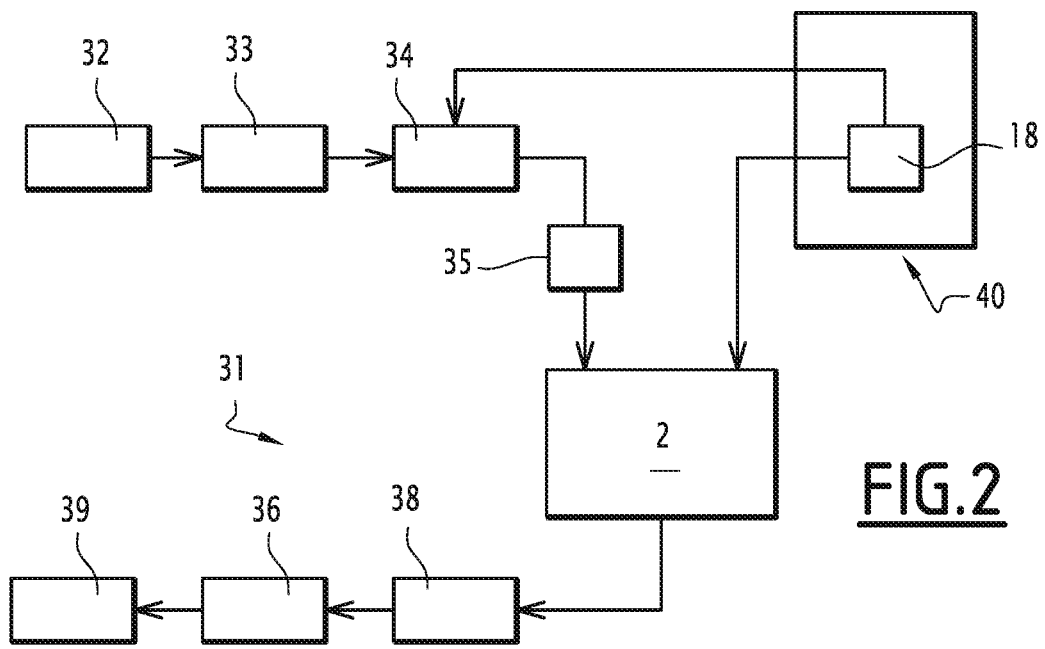

The invention and its advantages will be better understood upon reading the description which follows, exclusively given as an example, and made with reference to the appended drawings, wherein:

FIG. 1 is a schematic view of a biomass roasting facility for applying a biomass roasting method; and FIG. 2 is a schematic view of a roasting plant including the biomass roasting facility of FIG. 1.

DETAILED DESCRIPTION

The roasting facility 2 illustrated in FIG. 1 is provided for the roasting of biomass, in particular ligno-cellulose biomass. Ligno-cellulose biomass is for example formed with wood, shells of shell fruit, bagasse, straws such as for example, rice or wheat straw, barks or further residues of the use of oil palm fruit (called EFB, acronym of <<Empty Fruit Branch>>).

The roasting facility 2 comprises a roasting column 4 for flow by gravity of the biomass from the top to the bottom in the column 4, with a counter-current of hot gases flowing from the bottom to the top in the column 4.

The column 4 is tubular and extends vertically. The column 4 advantageously has a frustoconical shape becoming wider downwards. The column 4 is hollow and without any internal support for the biomass.

The roasting facility 2 comprises a supply system 6 for introducing the biomass BB at the top of the column 4.

The supply system 6 is leak-proof in order to prevent exit of hot gases from the column 4. For this purpose, the supply system 6 for example comprises an airlock 6A for introducing the biomass at the top of the column 4, preferentially a cellular valve.

The roasting facility 2 comprises an extraction system 8 for extracting the roasted biomass BT at the bottom of the column 4.

The extraction system 8 comprises a discharge device 8A closing the bottom of the column 4, the discharge device 8A retaining the biomass in the column 4 while allowing controlled flow of the biomass through the discharge device 8A. The discharge device 8A further allows the entry of hot gases into the column 4 through the extraction device.

The extraction system 8 here comprises a discharge box 8B positioned at the bottom of the column 4, the discharge device 8A being positioned in the discharge box 8B by closing the bottom of the column 4.

The discharge box 8B comprises a gas inlet for injecting hot gases under the discharge device 8A. The hot gases injected into the discharge box 8B enter the column through the discharge device 8A.

The material discharged by the discharge device 8A flows by gravity towards the bottom of the discharge box 8B.

The extraction system 8 is gas-tight in order to prevent the exit of hot gases from the column 4. For this purpose, the extraction system 8 for example comprises, at the bottom of the discharge box 8B, an airlock 8C and preferentially a cellular valve.

The extraction device 8A is for example a horizontal grid for retaining the biomass in the column 4, the grid being at least partly movable in order to cause flow of the biomass through the opening of the grid, the grid allowing the entry of hot gases at the bottom of the column 4 through the grid.

Alternatively, the extraction device 8A comprises a plurality of endless members (for example chains) wound around driving wheels and deflection wheels, so that retaining strands of the endless members are positioned parallel along a longitudinal direction while being side by side along a transverse direction while delimiting between them interstices, so that the retaining strands form together an openworked horizontal supporting surface for supporting the biomass received in the column 4, the driving wheels being driven into rotation so as to displace the retaining strands relatively to each other along the longitudinal direction, in order to cause flow of biomass through the supporting surface. Preferably, the driving wheels are driven into rotation so that the retaining strands moving in a sense along the longitudinal direction alternate along the transverse direction with retaining strands moving in the other sense along the longitudinal direction.

The extraction system 8 is gas-tight for preventing the exit of hot gases from the column 4. For this purpose, the extraction system 8 for example comprises an air lock for discharging the biomass having crossed the grid 8A, preferably a cellular valve.

When operating, the biomass introduced as a bulk material at the top of the column 4 forms a stack resting on the bottom of the column 4, more specifically on the discharge device 8A. The discharge of the roasted biomass by the bottom of the stack and the introduction of biomass to the top of the stack ensures a biomass flow from the top of the column 4 to the bottom of the column 4. The biomass discharge at the base of the stack causes flow by gravity of the remainder of the biomass towards the bottom of the column. The supply through the top compensates the biomass extracted from the bottom.

The roasting facility 2 comprises a transport and cooling device 10 for cooling the roasted biomass extracted with the extraction system 8.

The roasting facility 2 comprises a gas circuit 12 for recovering the gases at the top of the column 4 and re-injecting the recovered gases at the bottom of the column 4.

The gas circuit 12 ensures flow of the gases in a closed loop in the column 4 and the gas circuit 12.

When operating, the gases flow from the bottom to the top in the column 4 in contact with the biomass being treated, and are then recovered at the top of the column 4 with the gas circuit 12, and re-injected through the gas circuit 12 at the bottom of the column 4. The gases cross the packed bulk biomass stack in the column 4.

The gas circuit 12 comprises a heating device 14 for indirectly heating the gases before re-injecting them at the bottom of the column. The heating device 14 is configured for heating gases without injecting gas into the gas circuit 12. The heating device 14 comprises a heat exchanger 16 for heating the gases flowing in the gas circuit 12 by heat exchange between the gases flowing in the gas circuit 12 and a source of heat, without providing material into the gases flowing in the gas circuit 12.

In an embodiment, the heat source is formed with combustion gas provided by a combustion system 18 burning a fuel, the combustion gases generated by the combustion system 18 provide heat to the gases flowing in the gas circuit 12 in the heat exchanger 16, without any mixing between the gases flowing in the gas circuit 12 and the combustion gases provided by the combustion system 18. The heat exchanger 16 is then for example a gas-gas heat exchanger.

The gas circuit 12 comprises a system for purifying gases located in the gas circuit 12 between the top of the column 4 and the heat exchanger 16 of the heating device 14, in order to purify the gases leaving the column 4 before their passing into the heat exchanger 16.

The gas circuit 12 comprises a condenser 20 for condensing compounds present in the gases leaving the top of the column 4. The condenser 20 is positioned in the gas circuit 12 between the top of the column 4 and the heating device 14. The condensate formed in the condenser 20 is discharged from the gas circuit 12.

The gas circuit 12 further comprises at least one filtering device, positioned between the top of the column 4 and the heat exchanger 16 of the heating device 14, in order to remove the solid particles present in the recovered gases at the top of the column.

The gas circuit 12 comprises a downstream filtering device 22 positioned in the gas circuit 12 downstream from the condenser 20, and upstream from the heating device 14. The filtering device downstream from the condenser 20 gives the possibility of removing the fine particles present in the recovered gases at the top of the column after the condenser 20.

The gas circuit optionally comprises an upstream filtering device 23 positioned in the gas circuit 12 upstream from the condenser 20, between the top of the column 4 and the condenser 20. The filtering device upstream from the condenser 20 gives the possibility of removing the largest solid particles present in the recovered gases at the top of the column before the condenser 20. This improves the operation of the condenser 20 and of the downstream filtering device 22 which is then only responsible for filtering the finest particles.

The upstream 23 and downstream 22 filtering devices are for example separators with a cyclone effect, notably multi-cyclone separators.

Advantageously, the condenser 20 and the downstream filtering device 22 are integrated into a same unit 19 as illustrated in FIG. 1.

The condenser 20, the downstream filtering device 22 and the upstream filtering device 23 forms the purification system. Alternatively, the purification system comprises a single filtering device, positioned upstream or downstream from the condenser 20.

The roasting facility 2 comprises a device for regulating pressure in order to regulate the pressure of the gases flowing in the column 4 and the gas circuit 12.

The pressure regulation device is formed by a discharge branch 21 being supplied in the gas circuit 12, provided with a regulation valve 24, and opening into a discharge chimney 25. The pressure regulation device is located upstream from the heat exchanger 16 of the heating device 14. The discharge branch 21 is supplied here upstream from the heating device 14 and downstream from the downstream filtering device 22.

By opening the regulation valve 24, it is possible to discharge towards the discharge chimney 25 an excess of gas, in order to limit the pressure inside the column 4 and the gas circuit 12. The regulation valve 24 allows regulation of the gas flow extracted from the gas circuit 12 and from the column 4.

The roasting facility 2 comprises a source of inert gas 26 for injecting an inert gas into the column 4 and the gas circuit 12.

The inert gas source 26 is connected to the gas circuit 12 in one or several injection points for injecting the inert gas into the gas circuit 12.

The source of inert gas 26 is for example connected to the gas circuit 12 in an injection point located upstream from the bottom of the column 4 and downstream from the heating device 14 and/or in an injection point downstream from the top of the column 4 and upstream from the heating device 14. The source of inert gas 26 is here connected to the gas circuit 12 in two injection points: an injection point upstream from the bottom of the column 4 and downstream from the heating device 14, and an injection point downstream from the top of the column 4 and upstream from the heating device 14.

Preferably either one of the two injection points will be used selectively for introducing the inert gas into the gas circuit 12. In a particular embodiment, both injection points are used alternately.

The inert gas is a non-combustible gas. For example the inert gas is dinitrogen ($N_2$).

The gas circuit 12 comprises a carbon monoxide sensor 28 for measuring the carbon monoxide (CO) content of the gases flowing in the column 4 and in the gas circuit 12. The carbon monoxide sensor 28 is here located on the gas circuit 12 downstream from the heating device 14. Optionally, the carbon monoxide sensor 28 also measures the carbon dioxide ($CO_2$) content present in the gas circuit 12.

The gas circuit 12 comprises a dioxygen sensor 29 for measuring the dioxygen ($O_2$) content of the gases flowing in the column 4 and the gas circuit 12. The dioxygen sensor 29 is here located on the gas circuit 12 downstream from the heating device 14. Its role is to control the dioxygen content present in the roasting facility 2 during the purging operations and the phases for preparing and starting the roasting facility 2. The dioxygen sensor 29 also gives the possibility of detecting any accidental presence of dioxygen in a production mode and thus consequently controlling the injection of inert gas. Its installation between the heat exchanger 16 and the bottom of the column 4 where the gases are re-injected into the column 4 gives the possibility of controlling the dioxygen content of the gases at the inlet of the column 4 in order to avoid any risk of combustion of the biomass in the column 4 and explosion with the CO present in the gas circuit in the case of a too high dioxygen level.

The dioxygen level in the flow of hot gases injected at the bottom of the column 4, and controlled by the dioxygen sensor is maintained below 2%.

Optionally, the roasting facility 2 comprises a valve 27 for permanently limiting the pressure of the gases flowing in the column 4 and the gas circuit 12. The valve 27 is for example positioned at the top of the column 4.

When operating, the roasting facility 2 gives the possibility of applying a roasting method comprising a preparation phase, a starting phase and then a continuous production phase.

The column 4 is initially filled with biomass. The bulk biomass introduced into the column 4 forms a stack resting at the bottom of the column 4.

Subsequently, in a preparation phase, the roasting method comprises the sweeping of the column 4 and of the gas circuit 12 with an inert gas, so as to discharge the gases initially present in the column 4 and the gas circuit 12 and to fill the column 4 and the gas circuit 12 with inert gas. The gas circuit 12 is thus free of dioxygen ($O_2$). The inert gas is injected by means of the inert gas source 26. The column 4 and the gas circuit 12 are filled with inert gas until a determined starting pressure is attained, which is preferably equal to or less than 0.5 bars in any point of the gas circuit 12. The valve 27 is for example teared at a maximum pressure equal to or less than 0.5 bars, so as to limit the pressure in the column 4 and the gas circuit 12.

Next, in a starting phase, the gases present in the column 4 and the gas circuit 12 are caused to circulate in a closed loop and heated by means of the heating device 14. The biomass exposed to hot gases begins by discharging steam. In the starting phase, the gases flowing in the column 4 and the gas circuit 12 essentially contain inert gas and water.

Subsequently, in a continuous production phase, when the gases flowing in a closed loop attain a sufficient temperature at the bottom of the column 4 (about 200° C.), roasting of the biomass begins. Because of the roasting, organic compounds of the biomass are evaporated. The organic compounds and their respective proportions depend on the biomass used. Generally, the organic compounds are mainly carbon dioxide ($CO_2$), carbon monoxide (CO), methanol ($CH_3OH$), acetic acid ($CH_3COOH$), formic acid or methanoic acid (HCOOCH) and furfural ($C_5H_4O_2$). Other organic compounds appear in trace amounts.

The gases leaving the top of the column 4 pass into the condenser 20. The less volatile compounds are condensed. The major portion of the methanol, of the acetic acid, of the formic acid, of the furfural and of the other organic compounds resulting from roasting is condensed in the condenser 20 and recovered as a liquid. These organic compounds subsist as trace amounts downstream from the condenser 20.

Downstream from the condenser 20, the gases mainly contain steam, dinitrogen, carbon dioxide and carbon monoxide, there are trace amounts of organic compounds and of dioxygen.

The gases leaving the top of the column 4 are purified by removing solid particles, here by having them pass in the separator with the cyclone effect 22. This gives the possibility of removing fine particles of biomass carried away by the flow of gases during its passing in the column 4. Such particles may in the long run clog the gas circuit.

Because of the roasting, even if the major portion of the organic compounds is recovered as a liquid in the condenser 20, the amount of gas flowing in the column 4 and the gas circuit 12 tends to increase, which tends to increase the pressure. The pressure regulation valve 24 gives the possibility of maintaining the pressure in the column and in the gas circuit 12 in a determined pressure range (<0.5 bars).

In the continuous production phase, the gases flowing in the column 4 and the gas circuit 12 attain equilibrium in their composition.

Carbon monoxide is a combustible gas. Excessive presence of carbon monoxide may cause combustion of the biomass present in the column 4. However this combustion risk is only real if the carbon monoxide CO level attains its inflammability threshold, and if, simultaneously the carbon monoxide CO is brought to a sufficient temperature and if it is further put into contact with an oxidizer.

The roasting method comprises the measurement of the carbon monoxide content in the gases flowing in the column 4 and the gas circuit 12. The measurement is conducted here by means of the carbon monoxide sensor 28.

The roasting method comprises the injection of inert gas into the gases flowing in the column 4 and the gas circuit 12 for limiting the carbon monoxide content during roasting. The injection is carried out by means of the inert gas source 26.

In an embodiment, the roasting method comprises the injection of neutral gas when the carbon monoxide content in the gases flowing in the column 4 and the gas circuit 12 exceeds a predetermined threshold.

During the roasting phase, the bulk biomass forms a compact stack in the column 4, resting on the discharge device 8A. The treated biomass is extracted gradually at the bottom of the column 4, and the new biomass is supplied gradually through the top of the column 4. A biomass flow circulates in the column 4 from top to bottom.

During the continuous production phase, the gases are introduced at the bottom of the column 4 at a first temperature T1 and leave the top of the column 4 at a second temperature T2 below the first temperature T1.

The gases flow from the bottom of the column 4 towards the top of the column 4 by crossing the biomass stack present in the column 4. The gases arrive as hot gases at the bottom of the column 4 and are gradually cooled by flowing towards the top of the column 4 and by crossing the biomass stack. Thus, in the column 4 a temperature gradient decreasing from the bottom of the column 4 towards the top of the column 4 is established. The biomass is exposed at a gradually increasing temperature from the top of the column 4 to the bottom of the column 4.

The first temperature $T1$ is comprised between 200° C. and 350° C., preferably between 240° C. and 280° C. The second temperature $T2$ is preferably less than or equal to 80° C. The second temperature $T2$ is for example comprised between 60° C. and 80° C.

Between the top of the column 4 and the bottom of the column 4, the gases are heated up in the gas circuit 12, from the second temperature $T2$ to the first temperature $T1$, by having them pass into the heat exchanger 16.

The heating is achieved in the heat exchanger 16, without any injection of material, in particular of combustion gas, into the gases flowing in the column 4 and the gas circuit 12. The heating is carried out by heat exchange between the gases and a heat source through a wall of the heat exchanger 16, without any exchange of material.

Thus, the heating of the gases flowing in the column 4 and the gas circuit 12 does not modify their composition. In particular, the heating of the gases flowing in the column 4 and the gas circuit 12 by means of the heat exchanger does not risk introducing any dioxygen into the gases.

The heating of the gases in a heat exchanger 16 gives the possibility of using different heat sources for heating the gases. The heat source is for example some biomass, a solid or gaseous fossil source, unavoidable heat or a geothermal heart source. The expression "unavoidable heat" designates the heat produced by an industrial facility, non-upgraded on site in this industrial facility generating this heat and sent to another industrial facility using heat. The heat transport carrier is for example steam or fumes.

All the recycled gases flowing through the heat exchanger 16 are injected into the bottom of the column 4. The gases optionally discharged by the pressure regulation device are picked up in the circuit 12 upstream from the heat exchanger 16.

During the continuous production phase, only the gases generated by the roasting are added to the gases circulating in a closed loop in the column 4 and the gas circuit 12. This limits the thermal losses, and improves the overall energy yield of the roasting facility 2. The only gas optionally added is additional inert gas for limiting the carbon monoxide level. The roasting is carried out in the absence of dioxygen, which limits any risk of combustion.

It is possible to fill the column 4 with 80% of biomass in volume while having satisfactory heat exchanges between the hot gases and the biomass. The roasting in a column 4 thus gives the possibility of treating a large amount of biomass while retaining a compact and inexpensive roasting facility 2.

The roasting method gives the possibility of achieving efficient roasting at a temperature comprised between 240° C. and 280° C., which limits the energy cost of the application of the roasting while limiting the temperature of the gases, while obtaining a satisfactory yield.

As illustrated in FIG. 2, the roasting facility 2 is included in a roasting plant 31.

The roasting plant 31 comprises, upstream from the roasting facility 2, a biomass preparation device 32 and a device for drying biomass 34.

The device for preparing biomass 32 is for example configured for milling, refining and/or screening of the biomass supplying the roasting plant 31. The preparation of the biomass gives the possibility of giving it properties, in particular grain size properties, ensuring efficient roasting.

Smaller biomass particles have a greater exchange surface area with the hot gases relatively to their weight, but flow differently.

The drying device 34 is configured for drying at least partly the biomass and attaining a humidity level of the biomass of less than 30%. The roasting plant 31 comprises optionally an intermediate storage device 33 between the biomass preparation facility 32 and the biomass drying facility 34, and/or an intermediate storage device between the biomass drying facility 34 and the roasting facility.

Optionally, the roasting plant 31 may comprise, downstream from the roasting facility 2, a densification device 36 for densifying the roasted biomass provided by the roasting facility 2. The densification device 36 is configured for conditioning the roasted biomass into tablets, balls, bricks, small bricks or granules (or <<pellets>>) which are easily conditionable, transportable and usable.

The roasting plant 31 optionally comprises a buffer storage device 38 between the roasting facility 2 and the densification facility 36 and/or a downstream storage device 39 downstream from the densification facility.

The roasting plant 31 comprises a heating facility 40. The heating facility 40 supplies with hot gases the drier and the heat exchanger of the roasting facility 2.

The heating facility 40 for example comprises the combustion system 18. The combustion system 18 is configured for burning biomass for example, for example a fraction of the biomass supplying the roasting plant 31 and/or a fraction rejected by the biomass preparation facility 32.

The heating facility 40 is here pooled for heating the drier and the heat exchanger. In one alternative, the roasting plant comprises distinct heat sources for the heat exchanger and the drier, for example respective heating facilities for the drier and the heat exchanger.

The roasting plant 31 thus gives the possibility of using a minority of the biomass for roasting the majority of the biomass.

The invention claimed is:

1. A method for roasting biomass, comprising:
   the flow by gravity of biomass from the top to the bottom of a column with a counter-current of hot gases flowing from the bottom towards the top of the column, with establishment of an increasing temperature gradient from the top to the bottom of the column, the recovery of the gases at the top of the column and their recycling at the bottom of the column by means of a gas circuit comprising a closed loop configured such that the gases flow in the column and the loop in a closed manner, wherein the closed loop comprises a heat exchanger, and
   the heating of all the recovered gases by having them pass through the heat exchanger before their recycling at the bottom of the column, wherein the heating does not modify their composition, and
      wherein during a continuous production phase the gases flowing in the column and the gas circuit attain equilibrium in their composition such that during the continuous production phase only the gases generated by the roasting are added to the gases circulating in a closed loop in the column and the gas circuit.

2. The roasting method according to claim 1, comprising a preparation phase comprising filling the column and the gas circuit with an inert gas.

3. The roasting method according to claim 2, wherein, at the end of the preparation phase, the pressure in the column and in the gas circuit is less than 0.5 bars.

4. The roasting method according to claim 1, comprising the treatment of the recovered gases at the top of the column by having them pass in a condenser before their recycling at the bottom of the column, condensing compounds present in the gases, resulting in a condensate, wherein the condenser is positioned in the gas circuit between the top of the column and the heating device, and discharging the condensate from the gas circuit.

5. The roasting method according to claim 4, wherein the condenser is located upstream from the heat exchanger.

6. The roasting method according to claim 1, comprising the treatment of the recovered gases at the top of the column by having them pass in at least one filtering device for filtering out the solid particles contained in the gas, before their recycling at the bottom of the column.

7. The roasting method according to claim 6, wherein the filtering device is located upstream from the heat exchanger.

8. The roasting method according to claim 1, comprising the maintaining of a pressure of less than 0.5 bars inside the column by regulating a gas flow discharged from the column and/or from the gas circuit by means of a valve.

9. The roasting method according to claim 1, wherein all the recovered gases at the top of the column and heated up in the heat exchanger are injected at the bottom of the column.

10. The roasting method according to claim 1, comprising discharging excess gases out of the column and/or of the gas circuit for limiting and regulating the pressure in the column.

11. The roasting method according to claim 1, comprising adding inert gas to the gases flowing in the column and the gas circuit when the carbon monoxide content of the gases flowing in the column and the gas circuit exceeds a determined threshold.

12. The roasting method according to claim 1, wherein, in a continuous production phase, the gases recovered at the top of the column are at a temperature of less than or equal to 80° C.

13. The roasting method according to claim 1, wherein, in a continuous production phase, the gases are introduced at the bottom of the column at a temperature comprised between 200° C. and 350° C.

14. The roasting method according to claim 1, wherein the dioxygen content and/or the carbon monoxide content of the gases introduced at the bottom of the column are monitored.

15. A biomass roasting plant, comprising a column for the movement by gravity of the biomass from the top to the bottom of the column with a counter-current of hot gases flowing from the bottom to the top of the column, and a gas circuit comprising a closed loop configured for recovering the gases at the top of the column and re-injecting the gases at the bottom of the column so that the gases flow in the column and the closed loop in a closed manner, in which the closed loop comprises a heat exchanger for heating the recovered gases at the top of the column before their injection at the bottom of the column, wherein the heat exchanger is configured to heat all of the recovered gasses and to not modify the composition of the gases when in use.

16. The roasting plant according to claim 15, comprising a source of inert gas (26) for injecting inert gas into the column and the gas circuit.

17. The roasting plant according to claim 16, comprising a carbon monoxide sensor for determining the carbon monoxide content of the gases circulating in a closed loop.

18. The roasting plant according to claim 17, wherein the dioxygen sensor or the carbon monoxide sensor are located between the heat exchanger and the bottom of the column.

19. The roasting plant according to claim 16, comprising a dioxygen sensor for determining the dioxygen content of the gases flowing in a closed loop.

20. The roasting plant according to claim 15, wherein the gas circuit comprises a condenser for condensing organic compounds contained in the gases recovered at the top of the column, wherein the condenser is positioned in the gas circuit between the top of the column and the heating device, and the condenser is configured for condensing compounds present in the gases, resulting in a condensate, and for discharging the condensate from the gas circuit.

21. The roasting plant according to claim 15, comprising a separator of solid particles for separating the solid particles of the gases recovered at the top of the column.

22. The roasting plant according to claim 15, comprising at least one regulation valve for discharging the gas from the column or from the gas circuit.

* * * * *